(12) United States Patent
Boffelli et al.

(10) Patent No.: US 7,144,225 B2
(45) Date of Patent: Dec. 5, 2006

(54) DEVICE FOR CONTROLLING THE ACTUATING SHAFT OF MEANS FOR RECIRCULATING A COOLING FLUID IN VEHICLE ENGINES

(75) Inventors: Piercarlo Boffelli, Milan (IT); Claudio Bellotti, Cerro Al Lambro (IT); Erminio Depoli, Crema (IT); Fabio Natale, San Giuliano M.SE (IT)

(73) Assignee: Baruffaldi S.p.A., Milan (IT)

( * ) Notice: Subject to any disclaimer, the term of this patent is extended or adjusted under 35 U.S.C. 154(b) by 556 days.

(21) Appl. No.: 10/637,290

(22) Filed: Aug. 8, 2003

(65) Prior Publication Data

US 2005/0031455 A1    Feb. 10, 2005

(51) Int. Cl.
    *F04B 49/00*    (2006.01)
(52) U.S. Cl. ........................ 417/223; 417/374
(58) Field of Classification Search ............... 417/374, 417/223
    See application file for complete search history.

(56) References Cited

U.S. PATENT DOCUMENTS

| 2,765,891 | A |   | 10/1956 | Pierce |            |
|-----------|---|---|---------|--------|------------|
| 5,295,812 | A | * | 3/1994  | Steele | 418/55.1   |
| 6,007,303 | A | * | 12/1999 | Schmidt | 417/223   |
| 6,013,003 | A | * | 1/2000  | Boffelli et al. | 475/149 |
| 6,199,391 | B1 | * | 3/2001 | Link et al. | 62/133 |
| 6,234,769 | B1 | * | 5/2001 | Sakai et al. | 417/374 |
| 6,468,163 | B1 | * | 10/2002 | Boffelli et al. | 464/29 |

FOREIGN PATENT DOCUMENTS

| DE | 2318103     | 10/1974 |
|----|-------------|---------|
| DE | 41 21 240 A2 | 1/1993 |
| DE | 42 07 709 A1 | 9/1993 |
| DE | 42 07 710 A1 | 9/1993 |
| DE | 197 41 553 A1 | 3/1999 |
| GB | 1095515     | 12/1967 |
| JP | 59019723    | 2/1984  |

\* cited by examiner

*Primary Examiner*—Anthony D. Stashick
*Assistant Examiner*—Ryan Gillan
(74) *Attorney, Agent, or Firm*—Timothy J. Keefer; Seyfarth Shaw LLP

(57) ABSTRACT

Device for controlling the means (1) for recirculating a cooling fluid in engines (11*a*) in particular for vehicles and like, comprising a shaft (2) actuating the impeller, means (3,3*b*) for generating the movement of said shaft and means for transmitting the movement from the said generating means (3,3*b*) to the said shaft (2) of the impeller (1), in which said movement transmission means comprise a double-action coupling (30,40) comprising: magnetic means (31) integral with a rotor (30;130;230) and able to cooperate with corresponding magnetizable means (41;141;241) of a support (40;140;240) rotationally connected to the shaft (2) of the recirculating means and movable in an axial direction with respect thereto, so as to determine a first speed of rotation of the recirculating means (1), and electromagnetic means (22,22*a*) able to co-operate with a ring (41*a*;141*a*; 241*a*) integral with said support (40;140;240) so as to determine a second and different speed of rotation of the pump impeller (1).

50 Claims, 3 Drawing Sheets

DEVICE FOR CONTROLLING THE ACTUATING SHAFT OF MEANS FOR RECIRCULATING A COOLING FLUID IN VEHICLE ENGINES

The present invention relates to a device for controlling the means for recirculating a cooling fluid in engines in particular for vehicles.

It is known in the engine production sector that there exists the need to cool the engines by means of recirculation of a cooling fluid which is moved by means of a corresponding recirculating pump, the impeller of which is actuated by a shaft moved by a pulley and by a belt which is connected to the driving shaft.

It is also known that the recirculation of the cooling fluid must be performed with a throughput corresponding to the actual cooling requirement determined by the existing working conditions and by the external temperature in order to avoid the constant and unnecessary operation of devices which use working power, thereby increasing the consumption of the vehicle.

The technical problem which is posed, therefore, is that of providing a device for controlling the means for recirculating cooling fluids in engines for vehicles and the like, able to produce a variation in the speed of rotation of the said impeller.

These technical problems are solved according to the present invention by a device for controlling the means for recirculating a cooling fluid for engines in particular for vehicles and the like, comprising a shaft for actuating the impeller, means for generating the movement of said shaft and means for transmitting the movement from the generating means to the said shaft of the impeller, in which said movement transmission means comprise a double-action coupling comprising:

magnetic means integral with a rotor and able to cooperate with corresponding magnetizable means of a support rotationally connected to the shaft of the recirculating means and movable in an axial direction with respect thereto, in order to determine a first speed of rotation of the recirculating means and electromagnetic means able to co-operate with a ring integral with said support so as to determine a second and different speed of rotation of the pump's impeller.

Further characteristic features will emerge from the description below of a non-limiting example of embodiment of the device according to the invention provided with reference to the accompanying figures, in which:

FIG. 3b shows a cross-sectional view, similar to that of FIG. 3a, of a variation of embodiment of the device shown in said FIG. 3a.

Figure 1:
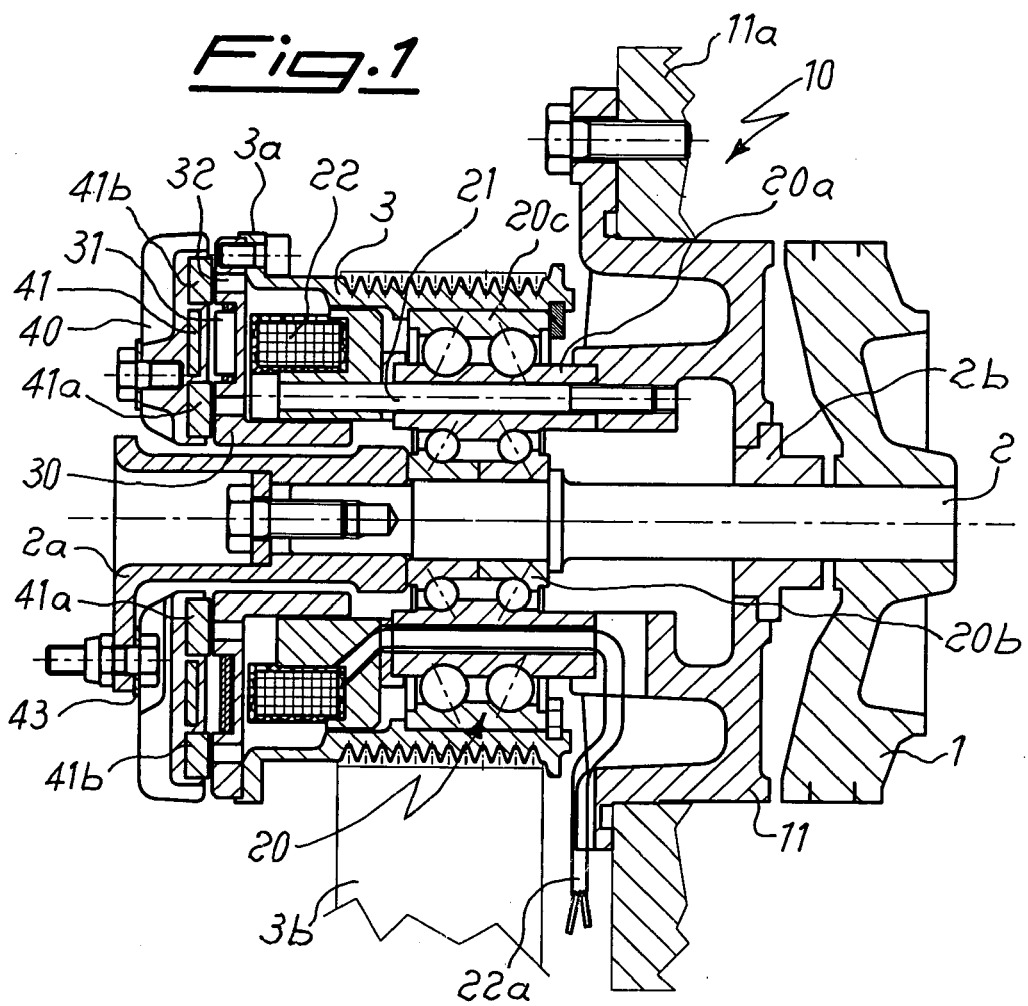
FIG. 1 shows a schematic cross-sectional view, along an axial plane, of a first embodiment of the device according to the present invention.

As illustrated in FIG. 1, the impeller 1 of a pump for recirculating the cooling fluid of vehicles and the like is mounted at a first end of a shaft 2 supported by a fixed assembly 10 comprising the body 11 of the pump integral with the base 11a of the vehicle engine.

The pump body 11 has, integral therewith, a seal 2b, coaxial to the shaft 2, and the middle race 20a of a stepped bearing 20, on the inner race 20b of which the shaft 2 of the impeller is keyed and the outer race 20c of which is integral with a pulley 3 for transmitting the movement to the device, in turn moved by a drive belt 3b.

The bearing 20 has races and balls with dimensions increasing in the radial direction from the axis of rotation of the shaft 2 outwards.

In greater detail said middle race 20a is integrally joined to the pump body 11 by screw means 21 or the like also able to retain on the race itself an electromagnet 22, excitation of which can be remotely controlled by means of wires 22a connected to a control unit (not shown).

The pulley 3 has a circumferential flange 3a with, constrained thereto, a coaxial rotor 30 which supports permanent magnets 31 arranged with an alternating North/South orientation, said magnets 31 being therefore movable rotationally with the rotor, but fixed in the axial direction.

Figure 1A:
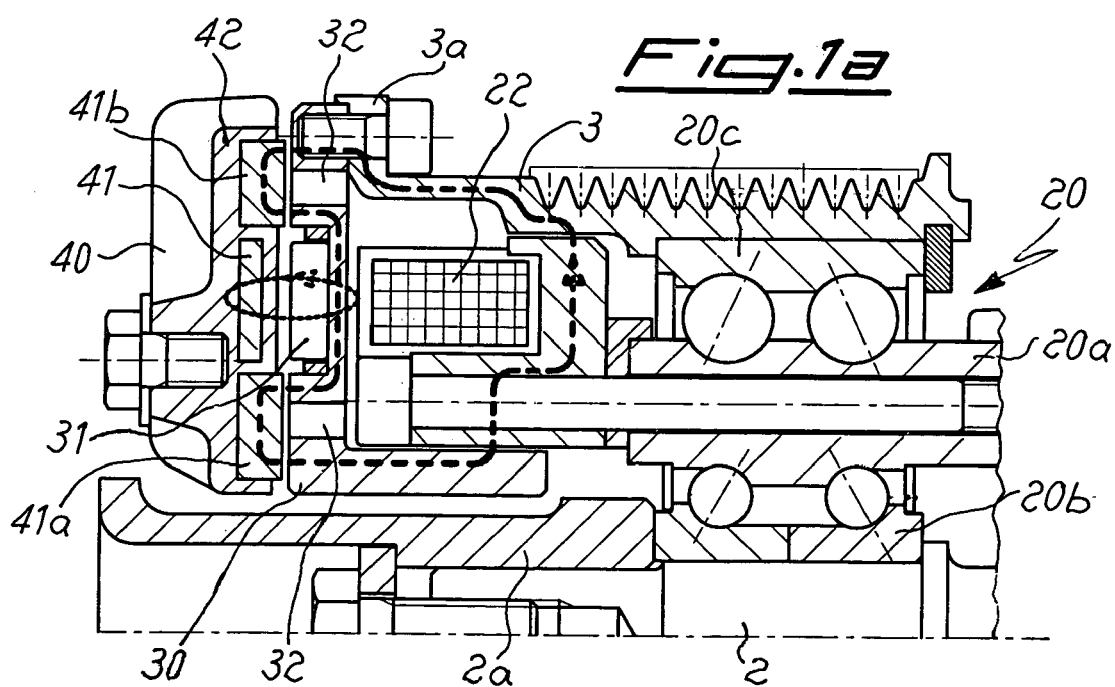
FIG. 1a shows a detail of the coupling and the magnetic flux lines of the device according to FIG. 1.

The part of the rotor 30 carrying the magnets 31 has interruptions 32 in the magnetic conductivity of the rotor so as to produce a suitable annular closure of the magnetic flux lines, as shown in FIG. 1a and as will emerge more clearly below.

In this way the rotor 30 with the permanent magnets 31 forms the first part of a coupling, the other part of which is formed by a support 40 which is made of conductive material such as aluminium or the like and which has, incorporated therein, a magnetizable element 41 arrange opposite the said permanent magnets 31 with a predetermined air-gap.

Said support 40 is constrained to a sleeve 2a which is in turn coaxially integral with the end of the shaft 2 opposite to that of the impeller 1, with the arrangement, in between, of a resilient membrane 43 having a suitably rigidity and able to allow an axial movement of the support 40, as will emerge more clearly below.

The support 40 also has, integral therewith, two coaxial rings 41a and 41b which are concentric with each other and in turn made of magnetizable material. The operating principle of the device is as follows during conditions when there is a reduced cooling requirement;

the electromagnet 22 is deactivated and therefore does not cause the formation of a magnetic field of attraction between rotor 30 and support 40;

the rotation of the permanent magnets 31 results in the formation of a parasitic current (Foucault effect) and a magnetic field between the said magnets 31 which are integral with the rotor and the magnetizable element 41 of the support 40, the flux lines of which (FIG. 1a) are closed between the support 40, by means of the rotor 30 and the fixed body of the electromagnet 22, causing the rotational driving of the support 40 by the rotor 30, the support being axially retained by the resilient membrane 43 which has an axial rigidity greater than the force of attraction of the permanent magnets 31, rotational driving of the said support occurring without contact with the rotor;

relative slipping of the support 40 with respect to the rotor 30 therefore occurs, with consequent rotation of the former, and therefore of the shaft 2 with associated impeller 1, at a speed lower than the speed of the movement generating pulley 3.

If overheating conditions should occur such as to require an increase in recirculation of the cooling water:

the electromagnet 22 is excited, resulting in the formation of an electromagnetic flux which, being closed as shown in FIG. 1*a*, causes the attraction, in the axial direction, of the support 40 by the rotor 30;

owing to the resilient ring 43, the support moves axially towards the rotor, attaching itself to the latter and allowing the closure of the lines of magnetic flux through the concentric rings 41*a*, 41*b*;

the support 40 of the coupling therefore rotates, firmly attached to the rotor 30, and determines, by means of the sleeve 2*a*, a speed of rotation of the shaft 2 and the impeller 1 which is substantially equal to that of the pulley 3 with a consequent increase in the recirculation of the cooling fluid.

As can be seen from the description given above (FIG. 1*a*) the magnetic flux lines of the permanent magnets 31 are contained within the magnetic circuit generated by the electromagnet 22, which allows the overall external dimensions of the device to be reduced.

Figure 2:
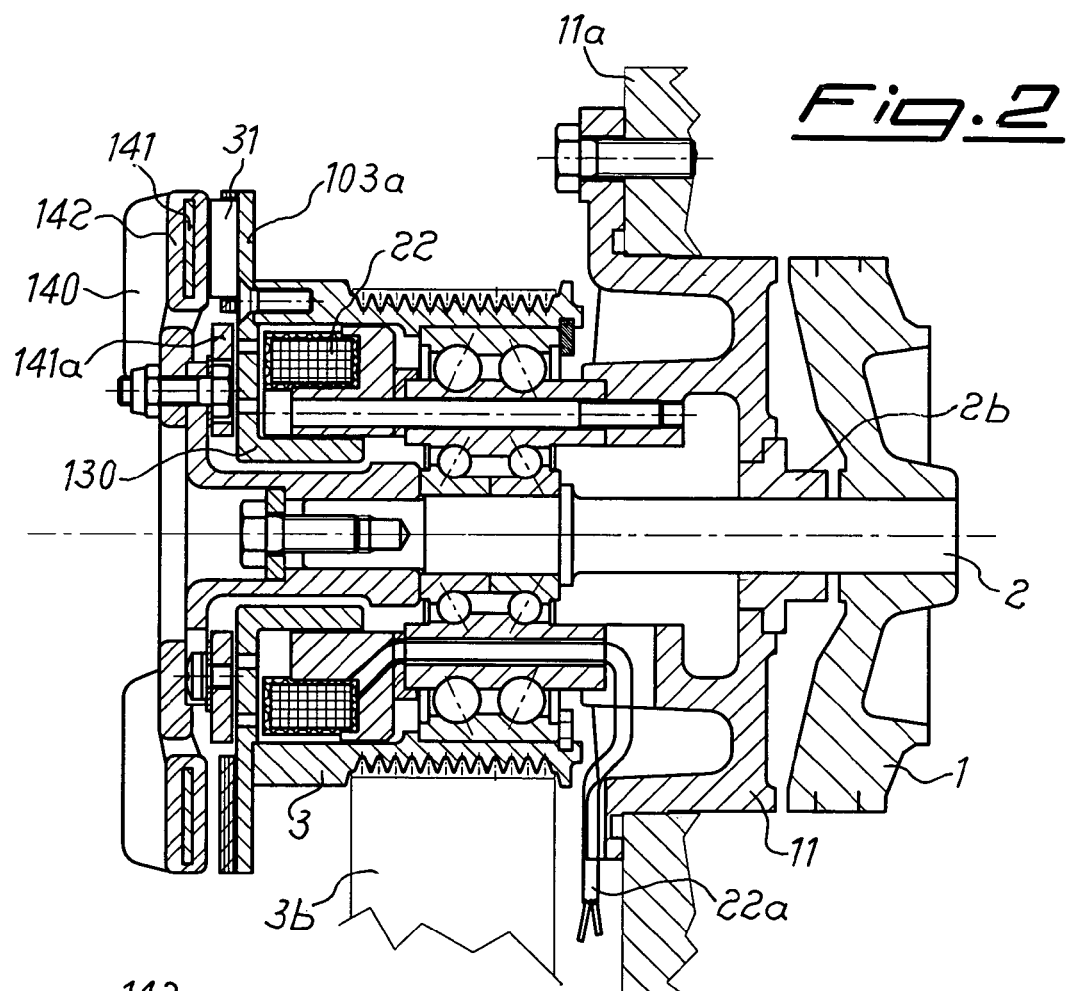
FIG. 2 shows a cross-sectional view, similar to that of FIG. 1, of a second example of embodiment of the device according to the present invention.
Figure 2A:
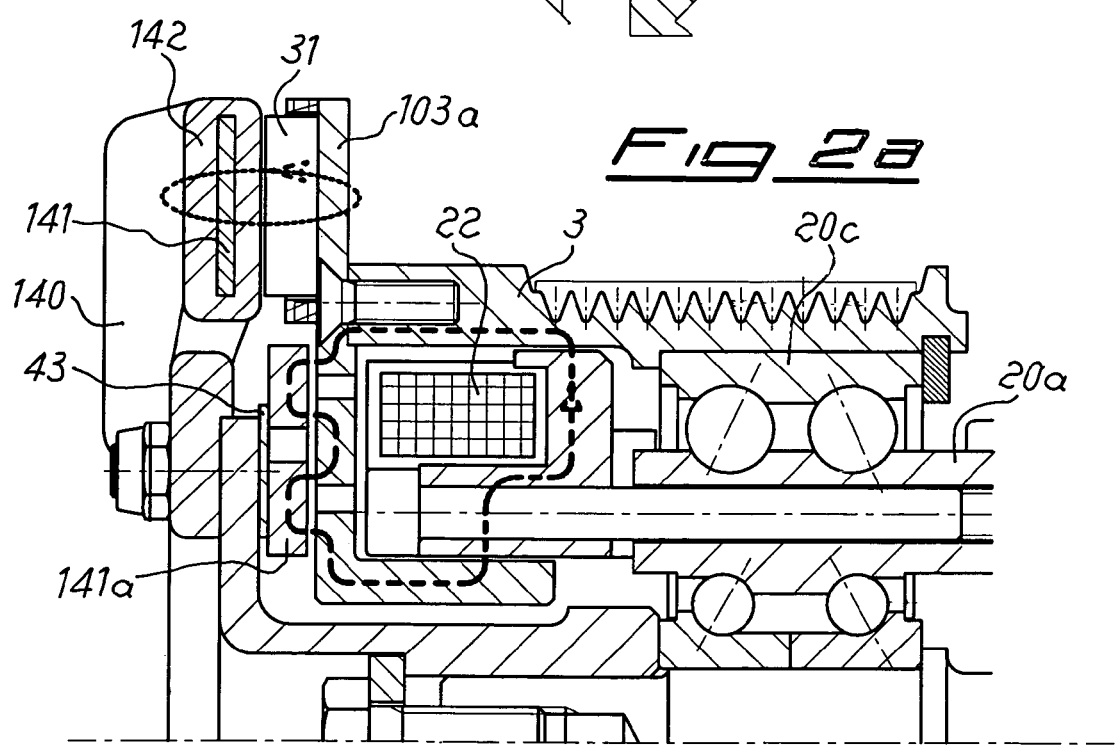
FIG. 2a shows a detail of the coupling and the magnetic flux lines of the device according to FIG. 2.

FIG. 2 shows a further example of embodiment of the device according to the invention in which it is envisaged that the flange 103*a* constrained to the pulley 3 is integral with the rotor 130 and extends radially from the latter outwards, so that the permanent magnets 31 (FIG. 2*a*) are contained within the larger-diameter circular rim, thus being situated outside the flux lines of the magnetic field generated by the electromagnet 22.

Correspondingly, the magnetizable iron ring 141, which is incorporated in the conductive ring 140, is arranged on a greater diameter corresponding to that on which the small magnets 31 lie and faces the latter with a suitable air-gap.

A ring 141*a* is also constrained to the support 140 with the arrangement, in between, of the resilient membrane 43 which allows the axial movement thereof.

It is thus possible to provide magnets 31 of a suitable size so as to be able to regulate correspondingly the "low" speed of the impeller: the larger are the magnets, the smaller will be slipping of the keeper during rotation and consequently the relative speed of rotation will be closer to that of the rotor 130.

This solution is particularly suitable for conditions where the ambient temperature is high or in any case such that the action of the electromagnet is limited solely to overheating conditions, recirculation of liquid determined by the speed which can be obtained with the permanent magnets alone being normally sufficient.

It is therefore clear how the device according to the present invention results in the possibility of obtaining two different speeds of rotation of the impeller of a recirculating pump, one being greater than the other or equal to/less than the speed of rotation of the movement generating pulley, and how the special configuration of the stepped bearing allows the radial dimensions of the pulley to be kept very small, allowing the electromagnet to be arranged outside the axial dimension of the said pulley.

In addition to this, the different dimensional design of the bearing in the radial direction and the fact that the middle race is integral with the fixed pump body allows all the pulling load of the belt and the pulley to be transmitted onto the fixed part so that the impeller actuating shaft is not subject to external overloads, with obvious advantages in terms of reliability and the possibility of reducing the corresponding dimensions.

Figure 3A:
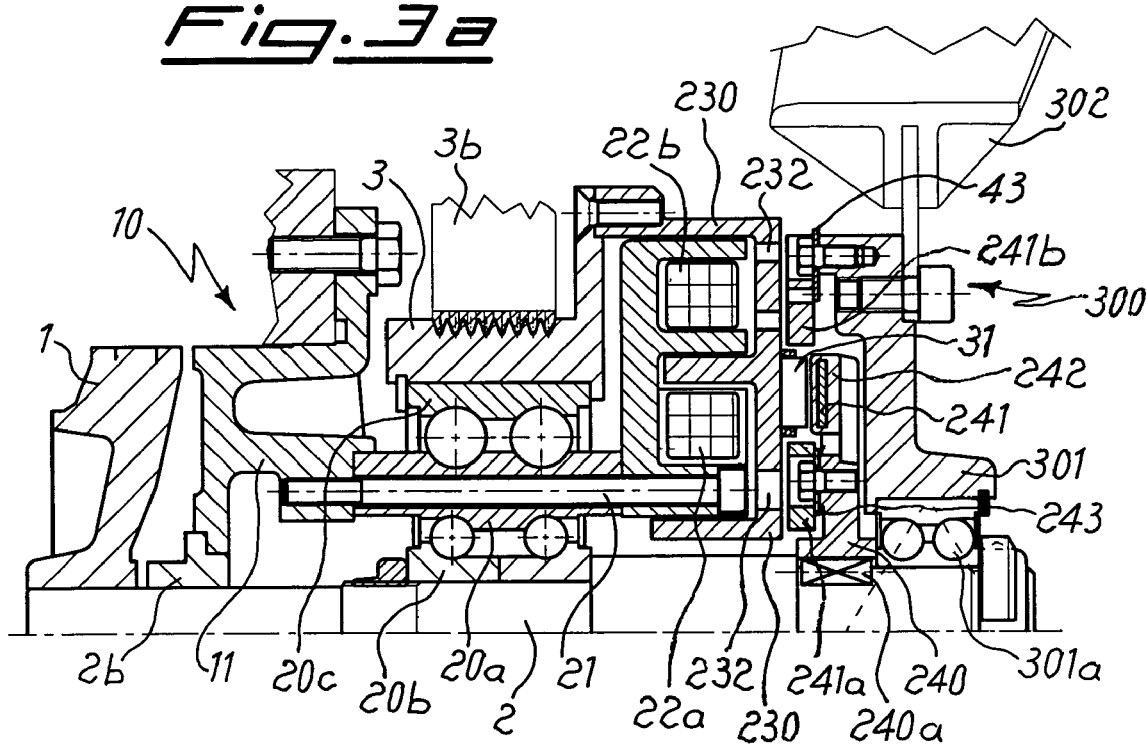
FIG. 3a shows a cross-sectional view, similar to that of FIG. 1, of a further example of embodiment of the device according to the present invention.

FIG. 3*a* shows a further embodiment of the device according to the present invention.

In this configuration the said shaft 2 supporting the impeller 1 of the pump also supports, at its opposite end, a fan 300 able to force air onto the radiator (not shown) containing the fluid moved by the pump 1 so as to obtain cooling of the said fluid.

Said fan is schematically shown with the blades 302 and a disk 301 for supporting them being mounted on the shaft 2 with the arrangement, in between, of a bearing 301*a* so as to be idle with respect to the said shaft.

This embodiment envisages the presence of two concentric electromagnets 22*a*, 22*b*, which can be excited independently of each other; correspondingly the rotor 230 has the form of an inverted "E" and still has the holes 232 for interruption of the magnetic flux. The magnets 31 are arranged in a substantially central position (in the radial direction) of the rotor 230 and are able to interact with a corresponding magnetizable element 241 which is mounted on a support 240 made of conductive material and constrained to the shaft 2 by means of a key 240*a*.

In a radial position closer to the axis of rotation than the magnetizable element 241, the support 240 carries a first ring 241*a* which is constrained to the said support by means of screw means and with the arrangement of a resilient membrane 243 in between: in this way the ring 241*a* is rotationally constrained to the support 240, but is able to move axially relative to the latter.

A second ring 241*b* is provided coaxially with respect to the said ring 241*a* and is arranged in a position radially more external than that of the first ring 241*a* and substantially facing the electromagnet 22*b*.

The second ring 241*b* is constrained, with the arrangement, in between, of an associated resilient membrane 243, to the said disk 301 of the fan 300.

With this configuration, the operating principle is as follows:

the impeller 1 of the pump is kept rotating always by means of coupling of the magnets 31 of the rotor 230 with the first magnetizable disk 241*a* of the support 240: since the coupling is of the parasitic current type with relative slipping of the two parts, the shaft 2 is made to rotate at a speed of rotation which is lower than that of the rotor 230 and can be determined by the mechanical and magnetic dimensional design of the circuit; the fan 300 is immobile;

if a greater recirculation of the fluid is required, the innermost electromagnet 22*a* is excited and recalls the first ring 241*a* which, being displaced axially against the recall action of the resilient membrane 243, is coupled to the rotor 230 and rotates together therewith, resulting in full-speed rotation of the shaft 2 corresponding to that of the rotor 230 or the pulley 3; the fan 300 is still immobile;

in conditions of overheating of the cooling fluid it is also possible to excite the outermost electromagnet 22*b*, which axially recalls the second disk 241*b* which, being coupled to the rotor 230, causes rotation of the disk 301 at full speed corresponding to that of the pulley 3.

Figure 3B:
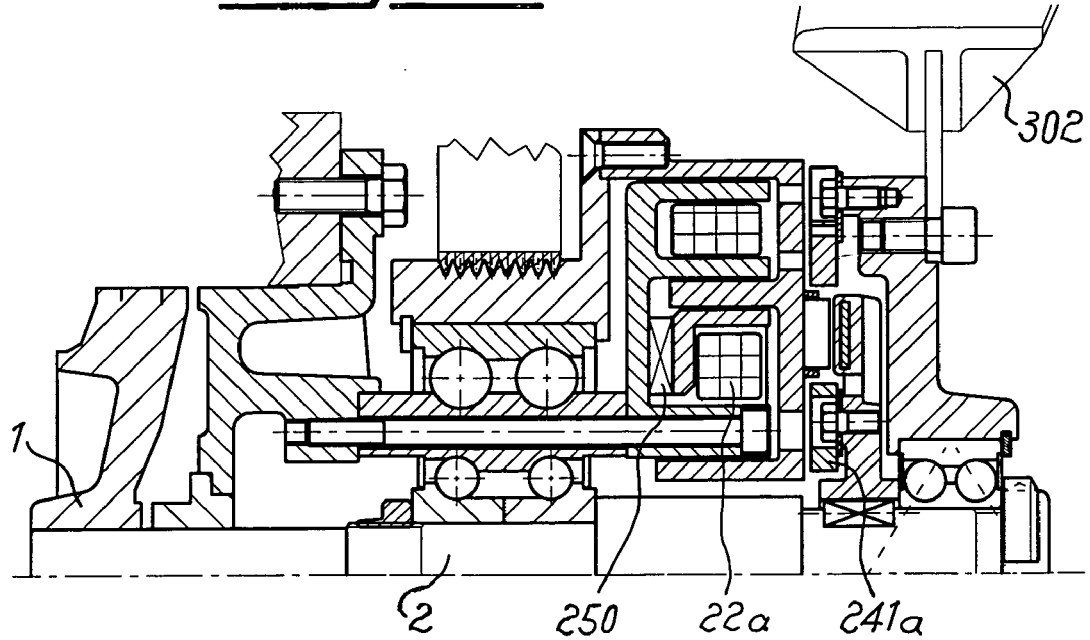

FIG. 3*b* shows a device which is similar to that of FIG. 3*a* and in which it is envisaged inserting a permanent magnet 250 opposite the first electromagnet 22*a*: in this way the rotation of the pump impeller 1 at full speed is also ensured in the event of an electrical failure which does not allow activation of the electromagnets.

In this configuration, in fact, the magnet 250 constantly attracts the first disk 241*a* against the rotor 30, ensuring in any case rotation of the pump 1 at full speed, while excitation of the first electromagnet 22*a* causes neutralization of the magnetic field generated by the magnet 250 and separation of the first ring 241a which is recalled by the resilient ring 243 and the consequent rotation of the fan at full speed determined by the magnets 31 acting on the ring 241.

Although not illustrated, a similar solution with the magnet 250 may be realized also for the circuit of the fan 300; in this case a second magnet 250 is also arranged opposite the electromagnet 22b with operation similar to that already described above.

The invention claimed is:

1. A device for controlling means (1) for recirculating a cooling fluid in engines (11a) in particular for vehicles, comprising a shaft (2) actuating an impeller, means (3,3b) for generating movement of said shaft and means for transmitting movement from the said generating means (3,3b) to the said shaft (2) of the impeller (1), characterized in that said movement transmission means comprises a double-action coupling (30,40) comprising: magnetic means (31) integral with a rotor (30;130;230) and able to co-operate with corresponding magnetizable means (41;141;241) of a support (40;140;240) rotationally connected to the shaft (2) of a recirculating means and movable in an axial direction with respect thereto, so as to determine a first speed of rotation of the recirculating means (1), and; electromagnetic means (22,22a) able to co-operate with a ring (41a;141a; 241a) integral with said support (40;140;240) so as to determine a second and different speed of rotation of the impeller (1); and a stepped bearing (20) including a fixed middle race (20a), wherein said electromagnetic means (22,22a) is integral with said fixed middle race.

2. The device according to claim 1, wherein said recirculating means consist of a pump comprising an impeller (1) and a fixed pump body (11) to which the middle race (20a) of a stepped bearing (20) is constrained.

3. The device according to claim 2, wherein said stepped bearing (20) also comprises an inner race (20b) carrying the shaft (2) of the impeller (1) and an outer race (20c) carrying the movement generating means.

4. The device according to claim 3, wherein said stepped bearing (20) has races and balls with dimensions increasing in a radial direction from the axis of rotation of the shaft (2) outwards.

5. The device according to claim 1, wherein said movement generating means consist of a pulley (3) actuated by an associated drive belt (3b).

6. The device according to claim 5, wherein that said pulley supports a coaxial rotor (30;130;230).

7. The device according to claim 6, wherein said magnetic means are integrally joined to said rotor (30;130;230).

8. The device according to claim 1, wherein said magnetic means are permanent magnets (31).

9. The device according to claim 1, wherein said electromagnetic means consist of an electromagnet (22;22a) which can be remotely activated.

10. The device according to claim 1, wherein said magnetic means (31) are arranged in a radial position contained within a radial dimension of flux lines of the magnetic field of said electromagnetic means (22).

11. The device according to claim 1, wherein said magnetic means (31) are arranged in a radial position outside a radial dimension of flux lines of the magnetic field of said electromagnetic means (22).

12. The device according to claim 11, wherein said rotor (130) has a flange (103a) extending radially outwards.

13. The device according to claim 11, wherein a magnetizable ring (141), which is integral with the support (140), is arranged along a diameter corresponding to that of permanent magnets (31) integral with a flange (103a) of a rotor (130).

14. Device according to claim 11, wherein said support (40;140;240) is integral with a ring (43;243) resilient in an axial direction of said ring.

15. The device according to claim 14, wherein said resilient ring (43;243) offers a resistance in the axial direction greater than the force of attraction of the said magnetic means (31), but less than the force of attraction of the electromagnetic means (22;22a).

16. The device according to claim 1, wherein said support shaft (2) also has, constrained to it, a fan (300) for cooling the cooling fluid, comprising a disk (301) supporting blades (302).

17. The device according to claim 16, wherein said disk (301) is mounted on the shaft (2) with the arrangement of a bearing (301a) in between so as to be idle with respect to the said shaft.

18. The device according to claim 16, wherein said electromagnetic means consist of a first electromagnet (22a) and a second electromagnet (22b) which are concentric with each other and coaxial with the shaft (2).

19. The device according to claim 18, wherein said electromagnetic means (22a,22b) can be excited independently of each other.

20. The device according to claim 16, wherein a rotor (230) is in the form of an inverted "E" and has holes (232) for interrupting magnetic flux.

21. The device according to claim 16, wherein a rotor (230) has, integral therewith, magnets (31) which are able to interact with corresponding magnetizable elements (241a) mounted on a support (240) constrained to the shaft (2) by means of a key (240a).

22. The device according to claim 21, wherein the support (240) has a first ring (241a) constrained to the support itself by means of associated locking means and with the arrangement of a resilient membrane (243) in between.

23. The device according to claim 21, wherein it envisages a second ring (241b) integral with a disk (301) of a fan (300) with the arrangement of a resilient membrane (43) in between.

24. The device according to claim 23, wherein said second ring (241b) is arranged in a position radially more external with respect to that of a first ring (241a) and substantially facing a second electromagnet (22b).

25. The device according to claim 23, wherein it comprises at least one permanent magnet (250) opposite a first electromagnet (22a).

26. Pump for recirculating a fluid for cooling engines in particular for vehicles, comprising an impeller (1), whose actuating shaft (2) is connected to means (3,3b) for generating movement of said shaft by means of associated movement transmission means, characterized in that said movement transmission means comprise a double-action coupling comprising: magnetic means (31) integral with a rotor (30;130;230) and able to co-operate with corresponding magnetizable means (41;141;241) of a support (40;140;240) rotationally connected to the shaft (2) of a recirculating means and movable in an axial direction with respect thereto, so as to determine a first speed of rotation of the recirculating means (1), and; electromagnetic means (22, 22a) able to co-operate with a ring (41a;141a;241a) integral with said support (40;140;240) so as to determine a second and different speed of rotation of a pump impeller (1); and a stepped bearing (20) including a fixed middle race (20*a*), wherein said electromagnetic means (22,22*a*) is integral with said fixed middle race.

27. The pump according to claim 26, wherein it comprises a fixed pump body to which the fixed middle race (20*a*) of a stepped bearing (20) is constrained.

28. The pump according to claim 27, wherein said stepped bearing (20) also comprises an inner race (20*b*) supporting the shaft (2) of the pump impeller (1) and an outer race (20*c*) supporting the movement generating means.

29. The pump according to claim 27, wherein said stepped bearing (20) has dimensions of the races and balls increasing in a radial direction from the axis of rotation of the shaft (2) outwards.

30. The pump according to claim 26, wherein said movement generating means consist of a pulley (3) actuated by an associated drive belt (3*b*).

31. The pump according to claim 30, wherein said pulley (3) supports a coaxial rotor (30;130;230).

32. The pump according to claim 31, wherein said magnetic means (31) are integral with said rotor (30;130;230).

33. The pump according to claim 26, wherein said magnetic means are permanent magnets (31).

34. The pump according to claim 26, wherein said electromagnetic means consist of an electromagnet (22;22*a*) which can be remotely activated.

35. The pump according to claim 26, wherein said magnetic means (31) are arranged in a radial position contained within a radial dimension of the flux lines of the magnetic field of said electromagnetic means (22).

36. The pump according to claim 26, wherein said magnetic means (31) are arranged in a radial position outside a radial dimension of the flux lines of the magnetic field of said electromagnetic means (22).

37. The pump according to claim 36, wherein said rotor (130) has a flange (103*a*) extending radially outwards.

38. The pump according to claim 36, wherein the magnetizable means (141), which is integral with the support (140), is arranged along a diameter corresponding to that of the magnetic means (31) integral with a flange (103*a*) of the rotor (130).

39. The pump according to claim 36, wherein said support (40;140;240) is integral with a ring (43;243) resilient in the axial direction.

40. The pump according to claim 39, wherein said resilient ring (43;243) offers a resistance in the axial direction of the ring greater than the force of attraction of the said magnetic means (31), but less than the force of attraction of the electromagnetic means (22;22*a*).

41. The pump according to claim 26, wherein said shaft (2) also has, constrained thereto, a fan (300) for cooling the cooling fluid, comprising a disk (301) supporting blades (302).

42. The pump according to claim 41, wherein said disk (301) is mounted on the shaft (2) with the arrangement, in between, of a stepped bearing (301*a*) so as to be idle with respect to the said shaft.

43. The pump according to claim 41, wherein said electromagnetic means consist of a first electromagnet (22*a*) and a second electromagnet (22*b*) which are concentric with each other and coaxial with the shaft (2).

44. The pump according to claim 43, wherein said electromagnetic means (22*a*,22*b*) can be excited independently of each other.

45. The pump according to claim 41, wherein the rotor (230) is in the form of an inverted "E" and has holes (232) for interrupting the magnetic flux.

46. The pump according to claim 41, wherein the rotor (230) has, integral therewith, magnets (31) which are able to interact with corresponding magnetizable elements (241*a*) mounted on a support (240) constrained to the shaft (2) by means of a key (240*a*).

47. The pump according to claim 46, wherein the support (240) has a first ring (241*a*) constrained to the support itself by means of associated locking means and with the arrangement of a resilient membrane (243) in between.

48. The pump according to claim 41, wherein it envisages a second ring (241*b*) integral with the said disk (301) of the fan (300) with an arrangement of a resilient membrane (43) in between.

49. The pump according to claim 48, wherein said second ring (241*b*) is arranged in a position radially more external with respect to that of a first ring (241*a*) and substantially facing a second electromagnetic means (22*b*).

50. The pump according to claim 48, wherein it comprises at least one permanent magnet (250) arranged opposite said electromagnet means (22;22*a*22*b*).

\* \* \* \* \*